United States Patent [19]

Kompelien

[11] 4,340,173
[45] Jul. 20, 1982

[54] LOW VOLTAGE POWER SUPPLY
[75] Inventor: Arlon D. Kompelien, Richfield, Minn.
[73] Assignee: Honeywell Inc., Minneapolis, Minn.
[21] Appl. No.: 260,662
[22] Filed: May 4, 1981
[51] Int. Cl.³ .......................... H02J 7/00; F23N 5/20
[52] U.S. Cl. ................................... 236/46 R; 307/66
[58] Field of Search ............... 236/46 R, 47; 165/12; 307/66

[56] References Cited
U.S. PATENT DOCUMENTS

| | | |
|---|---|---|
| 3,326,275 | 6/1967 | Ray . |
| 3,372,328 | 3/1968 | Pinckaers . |
| 3,667,539 | 6/1972 | Sweger . |
| 3,906,253 | 9/1975 | Farley . |
| 3,964,677 | 6/1976 | Schalow et al. . |
| 4,054,245 | 10/1977 | Bennetsen et al. . |
| 4,078,720 | 3/1978 | Nurnberg . |
| 4,154,397 | 5/1979 | Carlson ............................ 236/46 R |
| 4,191,328 | 3/1980 | Isaacs et al. ...................... 236/47 X |
| 4,197,992 | 4/1980 | Klebanoff .......................... 236/46 R |
| 4,215,815 | 8/1980 | Krump ............................. 236/46 R |
| 4,235,368 | 11/1980 | Neel ................................. 236/46 R |

*Primary Examiner*—William E. Wayner
*Attorney, Agent, or Firm*—Charles J. Ungemach

[57] ABSTRACT

A low dissipation two wire thermostat for connection to an alternating current source and a load to be controlled wherein, on alternate half cycles of the source, a rechargeable DC source, is recharged and, on the opposite half cycles, a capacitor is charged to control a comparator's output so as to cause a switching action that prevents high power dissipation in the thermostat for both the "on" and "off" conditions.

13 Claims, 2 Drawing Figures

LOW VOLTAGE POWER SUPPLY

BACKGROUND OF THE INVENTION

The present invention relates to a low voltage power supply and more particularly to one which is used in a two wire thermostat circuit to provide efficient low power dissipation in both the "on" and "off" states of the thermostat. The present invention uses switching devices to provide a DC voltage regulation. The switches operate in a shunting manner to minimize AC voltage drop in the load during a "on" condition so as not to reduce the supply voltage significantly. In the "off" state the switches are in series to minimize the AC load currents and any resulting DC supply dissipation.

DESCRIPTION OF THE PRIOR ART

In prior art devices, two wire power supplies are known such as are shown in U.S. Pat. Nos. 3,667,539 issued to Russell P. Sweager June 6, 1972; 4,054,245 issued to Wayne Bennetsen et al. Oct. 18, 1977; 3,906,253 issued to Ray Farley Sept. 16, 1975; 3,326,275 issued to W. A. Ray June 20, 1967; 4,078,720 issued to Richard K. Lernberg Mar. 14, 1978; 3,964,677 issued to Robert Schalow et al. June 22, 1976 and 3,372,328 issued to B. H. Pinckaers Mar. 5, 1968. None of the prior art can provide sufficiently low power consumption in both the "on" and "off" states of a thermostat. For example, in the above mentioned U.S. Pat. No. 3,964,677, while providing power in both the "on" and "off" states the circuit employs a string of limiting diodes and a series voltage drop regulating transistor to obtain voltage regulation. The regulating power dissipation of these components makes the thermal design for good temperature control difficult.

SUMMARY OF THE INVENTION

The present invention overcomes these problems by providing a circuit with a substantially constant regulated DC current to drive a load with sufficient current left over to provide a stable trickle charge current to a stand by battery or combination zener diode and capacitor. The basic operation of the circuit utilizes a comparator to detect when the proper regulated current flows each half cycle of power and then switches it off for the remainder of each half cycle. The output of the comparator controls two switches which perform the switching for the regulation function. In the thermostat "off" state the switches open the drive power from the AC load circuit each half cycle after sufficient regulated current flows in the DC supply. In the thermostat "on" state, the switches provide a short in the regulation circuit to stop regulation current after the proper amount flows. With this type of operation, the current drain or "off" state current is maintained at a minimum and in the "on" state the thermostat voltage drop is maintained at a minimum.

DETAILED DESCRIPTION OF THE PREFERRED EMBODIMENT

Figure 1:
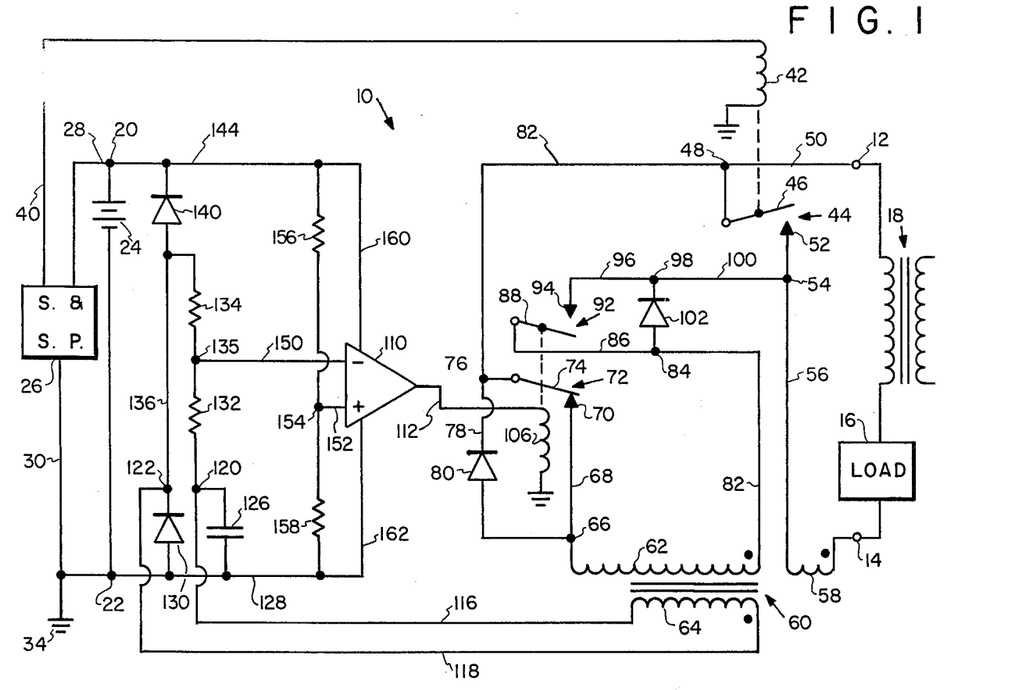
FIG. 1 is a general schematic diagram of one embodiment of the present invention; and, FIG. 2 is a schematic diagram of an alternate embodiment of the present invention.

FIG. 1 shows the power supply circuit 10 having a pair of input terminals 12 and 14 connected through the load 16 which may be the operating controls for a heating or cooling system and receiving AC power from a transformer 18. A pair of output terminals 20 and 22 are connected to the positive and negative terminals respectively of a battery 24 and supplies power to a thermostat sensing and signal processing circuit 26 by conductors 28 and 30 respectively. Conductor 30 is shown connected to signal ground at 34. The sensing and signal processing circuit produces an output on a conductor 40 shown connected to a relay winding 42 to operate a thermostat switch 44 between an "off" position as shown in FIG. 1 and an "on" position upon a receipt of an output on conductor 40. Relay 42 may be a latching relay to conserve power. Switch 44 has a movable arm 46 connected to a junction point 48 and by a conductor 50 to the input terminal 12. Switch 44 also has a fixed contact 52 connected to a junction point 54 and by a conductor 56 to a small winding 58 which is connected to the other input terminal 14. Winding 58 is part of a transformer 60 having a second winding 62 and an output winding 64. Winding 62 is comprised of a large number of turns and produces considerable impedance to current flow while winding 58 has only a small number of turns producing little impedance to current flow. One end of winding 62 is connected to a junction point 66 and by means of a conductor 68 to a stationary contact 70 of a switch 72. A movable arm 74 of switch 72 is connected to a junction point 76 and by means of a conductor 78 to a diode 80, the other side of which is connected to junction point 66. Junction point 76 is connected by a conductor 82 to junction point 48 and thus to the input supply terminal 12. It can be seen that when switch 72 is closed as shown in FIG. 1 diode 80 is short-circuited.

The other end of winding 62 is connected by a conductor 82 to a junction point 84. Junction point 84 is connected by a conductor 86 to a movable arm 88 of a switch 92. A Stationary contact 94 of switch 92 is connected by a conductor 96 to a junction point 98 and by way of a conductor 100 to junction point 54. A Diode 102 is connected between junction points 98 and 84.

Movable switch arms 88 and 74 of switches 92 and 72 respectively are operated by a solenoid 106 which is controlled by the output of a comparator 110 via a conductor 112. Upon the occurrence of an output or a "1" signal from comparator 110, solenoid 106 will be activated to the position shown in FIG. 1. With no output or a "0" signal from comparator 110, solenoid 106 will be deactivated to move switch arm 74 out of contact with contact 70 and switch arm 88 into contact with contact 94.

The output winding 64 of transformer 60 is shown connected by a pair of conductors 116 and 118 to a pair of junction points 120 and 122 respectively. Junction point 120 is connected through a capacitor 126 and a conductor 128 to output terminal 22 and thus to signal ground at 34. Junction point 122 is connected to a diode 130 to conductor 128 and thus to signal ground. Junction point 120 is connected to resistor 132 of the voltage dividing circuit consisting of resistors 132 and 134 having a center tap 135. The other side of resistor 134 is connected to a conductor 136. One end of which is connected to junction point 122 and the other end of which is connected through a diode 140 to a conductor 144 connected to output terminal 20 and thus to the positive side of battery 24 and the output conductor 28 for the sensing and signal processing circuit 26. The center tap 135 of the voltage divider between resistors 132 and 134 is connected by a conductor 150 to a negative input of comparator 110. The positive input of comparator 110 is connected by a conductor 152 to a junction point 154 which is the center tap of a second voltage dividing circuit comprising a pair of resistors 156 and 158 that have their ends connected to conductors 144 and 128 respectively. Conductors 144 and 128 are also shown connected to upper and lower power inputs of comparator 110 by conductors 160 and 162 respectively.

OPERATION OF FIG. 1

In considering the operation of FIG. 1 it will be convenient to look at the status of the circuit under four separate conditions. In the first it will be assumed that the thermostat switch 44 is "off" or open and the output of transformer 18 is in a positive half cycle so that input terminal 12 is positive with respect to input terminal 14. In the second condition it will be assumed that the thermostat switch 44 is open, the output of transformer 18 is in a negative half cycle so that input terminal 12 is negative with respect to the input terminal 14. In the third condition it will be assumed that thermostat switch 44 is "on" or closed and the output of transformer 18 is in the positive half cycle. In the fourth condition it will be assumed that thermostat switch 44 is closed and the output of transformer 18 is in the negative half cycle.

Under the first condition with switch 44 open and transformer 18 in the positive half cycle, a positive voltage will appear at terminal 12 relative to terminal 14. It is seen that a current path exists between the upper teminal of the secondary winding of transformer 18 through terminal 12 along conductors 50 and 82 to junction point 76 through switch 72 and conductor 68 to junction point 66, through winding 62 of transformer 60 along conductor 82 to junction point 84, through diode 102 to junction point 98 along conductors 100 and 56 through small secondary winding 58 of transformer 60 to terminal 14 and through load 16 to the lower terminal of the secondary winding of transformer 18. Since the winding 62 presents considerable impedance to current flow, the amount of current in the above-described circuit is very small and is insufficient to operate load 16. The small current does, however, induce a current in the secondary winding 64 of transformer 60 which flows along conductor 116 to junction point 120 through capacitor 126, where it operates to charge capacitor 126, and thence along conductor 128 through diode 130 to junction point 122 and then along conductor 118 back to transformer secondary 64. This current continues to flow during the positive half cycle until the charge on capacitor 126 is sufficiently large to bring the voltage at the negative terminal of comparator 110, via resistor 132, junction point 135 and conductor 150 up to a value equal to the voltage at the positive terminal of comparator 110. If resistors 156 and 158 are of equal size, the voltage on the positive terminal of comparator 110 is one half the voltage E of battery 24 between conductors 144 and 128.

Still during the positive half cycle from transformer 18, when the voltage at negative input terminal of comparator 110 has become equal to ½ E, comparator 110 changes state and produces a low or "0" signal on conductor 112 to solenoid winding 106 which then deactivates to open switch 72 and close switch 92. When switch 72 is opened, the above described path of current there through is cut off and since the current cannot flow through diode 80 in its reverse direction no current path exists through transformer windings 62 and 58 of transformer 60 and the current in secondary winding 64 of transformer 60 ceases. This situation continues during the remaining portion of the positive half cycle from transformer 18.

During the negative half cycle from transformer 18 current will flow from the secondary of transformer 18 downward through load 16 to terminal 14 through small winding 58 of transformer 60, via conductors 56, 100 and 96 through now closed switch 92, then via conductors 86 and 82 through the large winding 62 of transformer 60 to junction point 66. From junction point 66 current now travels in the forward direction through diode 80 and along conductor 78 and 82 to junction point 48 and from junction point 48 through conductor 50 and terminal 12 back to the secondary winding of transformer 18. Again because of the high impedance of the large winding 62, the current in this path is very small and insufficient to operate load 16. Again however, a current is generated in winding 64 of transformer 60 which now flows along conductor 118, junction point 122, along conductor 136 through diode 140 to output terminal 20, and through battery 24 which causes it to recharge. From the negative side of battery 24 current flows to output terminal 22 back to capacitor 126 in a direction opposite to that considered above and via conductor 116 back to the secondary 64 of transformer 60. It is seen that the potential on capacitor 126 now aids the transformer output winding in driving the current out to the battery 24 and that the voltage at the upper end of resistor 134 on conductor 136 is greater than the battery voltage by the amount of the voltage drop across diode 140. Since the voltage on conductor 136 is now positive, the voltage at the negative input of comparator 110 increases to a more positive value and some discharge of capacitor 126 is required before the negative input of comparator 110 becomes lower than the positive input. When, however, sufficient discharge occurs in capacitor 126 to reduce the voltage at the negative input of comparator 110 below the voltage of the positive input, the comparator 110 then changes state and the signal on conductor 112 becomes high or positive to activate solenoid 106. This action brings switch 72 back to the closed position and switch 92 back to the open position as shown in FIG. 1. The opening of switch 92 removes the current path through the transformer windings 58 and 62 thereby removing all current through load 16 and preventing further current from being generated in the secondary 64 of transformer 60. This situation will continue during the remaining negative half cycle of transformer 18.

The system will continue to operate in the above manner for further positive and negative half cycles of the supply so long as thermostat switch 44 remains open. It is seen that with the thermostat switch 44 in an open position either a very small current or none is generated during both the positive and negative half cycles of the supply voltage. The system operates first to build up of voltage on capacitor 126 and then to cause a flow of trickle current through battery 24 thereby recharging it and maintaining the voltage to the input of the sensing and signal processing circuit 26. Accordingly very little power is dissipated allowing for good temperature control and very low current passes through load 16 allowing it to remain off.

Under condition three it is assumed that the thermostat switch 44 is in a closed position. During the first or positive half cycle of the supply voltage from transformer 18 a current path is formed from the upper portion of the secondary transformer 18 through terminal 12 conductor 50 to point 48 and from there through switch 44, junction point 54, conductor 56, transformer winding 58, terminal 14 and load 16 back to the secondary of transformer 18. In this case since the impedance of transformer winding 58 is small, the current passing through the above-described circuit is sufficiently high to actuate the load 16 and thus produce heating or cooling action, as the case may be. Also with a high current passing through transformer winding 58 a current will again be generated in the secondary 64 of transformer 160 which will travel along conductors 116 to junction point 20, through capacitor 126, thereby charging capacitor 126 as was the case in condition 1, junction point 120, conductor 128 through diode 130, junction point 122 and conductor 118 back to the secondary 64. Again the voltage at the negative terminal of comparator 110 increases until it equals the voltage at the positive terminal, at which time the signal on conductor 112 again changes state deactivating solenoid winding 106 thereby opening switch 72 and closing switch 92.

With switch 92 closed a short circuit develops across transformer winding 62 by way of junction point 66, diode 80, conductors 78 and 82, junction point 48, closed switch 44, junction point 54, conductors 100 and 96, though now closed switch 92, conductor 86 and conductor 82. With winding 62 shorted, the induced current from winding 58 of transformer 60 through the short-circuited path reduces the volts per turn of transformer 60 and the current from secondary 64 ceases. The current through winding 58 of transformer 60 is therefore allowed to flow with a minimum dissipation so as to assure that the current to the load 16 is maximized. This condition continues during the remainder of the first or positive half cycle of the supply current.

When the supply current across the secondary winding of transformer 18 enters the second or negative half cycle, a current path exists from the lower terminal of the secondary of transformer 18 through the load 16, terminal 14, the transformer winding 58, conductor 56, junction point 54, closed switch 44, junction point 48, conductor 50, and terminal 12 to the upper end of the secondary of transformer 18. Again, since the impedance of winding 58 is low, the current in this path is sufficient to continue activating the load 16. It should now be noticed that the induced current in winding 62 of transformer 60 is in the reverse direction and is thus blocked by diode 80 so that again the volts per turn is increased and a current is induced in secondary winding 64 of transformer 60. This current now travels along conductor 118 to junction point 122 upwards along conductor 136, through diode 140, conductor 144 to output terminal 20, down through battery 24 to output terminal 22, along conductor 128 and again through capacitor 126, in a discharge direction, to junction point 120 and via conductor 116 back to secondary 64. As was the case in condition 2 the current flow is aided by a charge which has built up on capacitor 126 and again, with the voltage on conductor 136 becoming positive, the voltage at the negative input terminal of comparator 110 is increased so to be greater than it was. For this reason capacitor 126 must discharge for a certain period of time to bring the voltage on the negative terminal of comparator 110 back down to the voltage at the positive terminal. During this time, battery 24 continues to charge. When the voltage at the negative terminal of comparator 110 is again reduced to the value of the voltage at the positive terminal, the output of comparator 110 on conductor 112 again changes state and solenoid 106 is activated so as to close switch 72 and open switch 92 as is shown in FIG. 1.

Again a short circuit develops across winding 62 of transformer 60 by virtue of the path from conductor 82, junction point 84 diode 102, junction point 98, conductor 100, closed switch 44, junction point 48, conductor 82, junction point 76, closed switch 72, conductor 68 and terminal 66 so that again a induced current in this winding reduces the volts per turn of transformer 60 and the secondary current in transformer winding 64 ceases. Again the current through winding 58 of transformer 60 is allowed to flow with minimum dissipation thus assuring that the current through load 16 remains at a high value. The above condition continues until the end of the negative half cycle from transformer 18. The above operation continues for further positive and negative half cycles of the supply so long as switch 44 remains closed.

As explained, the current from diode 140 is produced every negative half cycle. The average value of this current is regulated by the controlled voltage swing on capacitor 126; i.e., the value it reaches when charging during the positive half cycle to cause comparator 110 to switch and the value it reaches after the start of the negative half cycle when it has discharged sufficiently to reswitch comparator 110. These values are controlled by the magnitudes of resistors 132 and 134. The result is a regulated current supply for battery 24 and the sensing and signal processing circuit 26.

It is seen that the above described circuit provides a regulated output supply current to the thermostat in both the "on" and "off" states. Furthermore, the circuit is capable of providing a sufficiently regulated DC current to maintain a supply for a sensing and signal processing circuit with sufficient current left over to provide a stable trickle charge current to the stand-by battery. In case the battery is not needed, it can be replaced with a zener diode and filter capacitor like that used in connection with FIG. 2 to be described. It is seen that the basic operation of the circuit utilizes a comparator to detect when the proper DC regulated current flows in each half cycle of power and then switches it off for the remainder of each half cycle with a minimum amount of circuit dissipation. The output of the comparator controls two switches which perform the switching for the regulation function. The relays must be very rapid since they operate each half cycle of the supply and it is preferable to use solid state switches as will be used in connection with FIG. 2. Nevertheless, the circuit will operate satisfactorily with a large variety of loads and performs well in circuits having a voltage range in the order of 13 to 30 volts and load currents in the order of 0.15 to 1.2 amps. Of course, the overall efficiency of the circuit is dependent on specific transformer characteristics and other circuit parameters such as switching component impedances. Nevertheless, the design gives very lower power dissipation while controlling load 16 as is desired.

Figure 2:
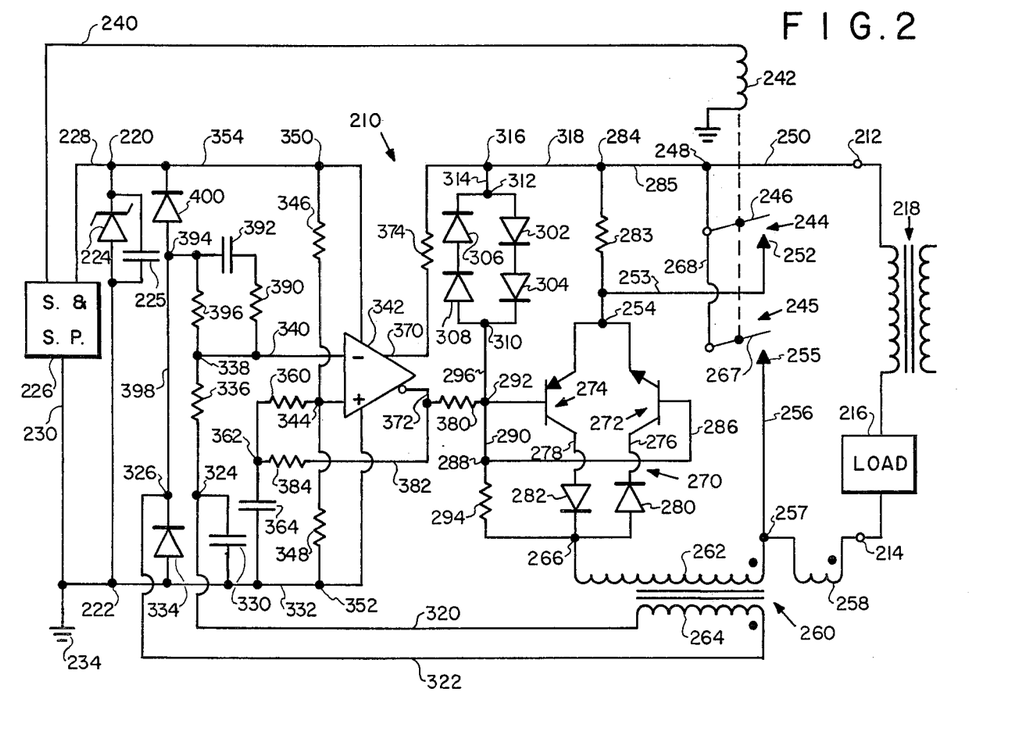

Referring now to FIG. 2 a voltage supply circuit 210 is shown connected to a pair of terminals 212 and 214, which, like in FIG. 1 are connected to a load 216 in series with a transformer 218. The output of voltage supply circuit 210 appears across output terminals 220 and 222 which have, connected therebetween, a zener diode 224 in parallel with a capacitor 225 instead of a battery as was used in FIG. 1. As in FIG. 1, supply terminals 220 and 222 are connected to a sensing and signal processing circuit 226 by conductors 228 and 230 respectively. Conductor 230 is shown connected to signal ground at 234. The output of the sensing and signal processing supply circuit 226 is shown on a conductor 240 which operates a solenoid 242 and thus to open and close a pair of switches 244 and 245. Again solenoid 242 and switches 244 and 245 may be a latching relay to conserve power. A movable contact member 246 of switch 244 is connected to a junction point 248 and by a conductor 250 to the terminal 212. A fixed contact 252 of switch 244 is connected by a conductor 253 to a junction point 254. Switch 245 has a fixed contact 255 which is connected by a conductor 256 to a junction point 257 and through a transformer winding 258 of a transformer 260 to terminal 214. As before, transformer winding 258 has a small number of turns so as to provide a low impedance. Transformer 260 has a winding 262, with a large number of turns to provide a high impedance, and has a secondary winding 264. One side of winding 262 is connected to junction point 257 and the other side is connected to junction point 266. The movable arm 267 of switch 245 is connected by conductor 268 to a movable arm 246 of switch 244 and thus to junction point 248.

The circuit between junction points 254 and 266 comprise a transistor switching circuit 270 consisting of an NPN transistor 272 and a PNP transistor 274. The collectors of transistors 272 and 274 are connected by conductors 276 and 278 respectively to a pair of diodes 280 and 282 respectively, the other sides of which are connected to junction point 266. Diode 280 is poled to conduct current upward in FIG. 2 and thus in the direction of current flow through transistor 272 while diode 282 is poled to conduct current downward in FIG. 2 and thus in the direction of current flow through transistor 274. The emitters of transistors 272 and 274 are shown connected to junction point 254, through a resistor 283 to a junction point 284. Junction point 284 is connected to junction point 248 by a conductor 285 and thus to terminal 212 via conductor 250. The base of transistor 272 is connected by a conductor 286 to a junction point 288 and through a conductor 290 to a junction point 292 connected to the base of transistor 274. Junction point 288 is shown connected by a resistor 294 to junction point 266. Junction point 292 is shown connected by a conductor 296 to a voltage regulating circuit comprising series diodes 302 and 304, poled to conduct current downwardly in FIG. 2, in parallel with series diodes 306 and 308 poled to conduct current upwardly in FIG. 2. The lower terminal of diodes 304 and 308 are connected to a junction point 310 which is connected to conductor 296 and the upper terminals of diodes 302 and 306 are connected to a junction point 312 which is connected by a conductor 314 to a junction point 316 and through a conductor 318 to junction point 248, conductor 285, junction point 248 and thus to the input terminal 212 via conductor 250.

A secondary transformer winding 264 of transformer 260 is connected by a pair of conductors 320 and 322 to junction points 324 and 325 respectively. Junction point 324 is connected through a capacitor 330 to a conductor 332 while junction point 326 is connected through a diode 334 to conductor 332. Conductor 332 is connected to output terminal 222 and thus to signal ground at 234. Junction point 324 is also connected through a resistor 336 to a junction point 338 and through a conductor 340 to the negative input of a comparator 342. The positive input of comparator 342 is connected to a junction point 344 which forms the intersection between a pair of resistors 346 and 348 connected between a pair of junction points 350 and 352 respectively. Junction point 352 is connected to conductor 332 and thus to signal ground while junction point 350 is connected by a conductor 354 to the output terminal 220. Junction point 344, connected to the positive input of comparator 342, is shown connected through resistor 360 to a junction point 362. Junction point 362 is connected to a capacitor 364 whose other side is connected to conductor 332 and thus to signal ground. Comparator 342 is shown having a first non-inverted output on a conductor 370 and an inverted output on a conductor 372. The non-inverted output on conductor 370 is connected through a resistor 374 to the junction point 316 and thus to the supply input terminal 212. The purpose of the path from junction point 316 through resistor 374 to the non-inverted output conductor 370 of comparator 342 is to provide a return path for the operating signal output from comparator 342 from the inverting output conductor 372. Output conductor 372 is shown connected through resistor 380 to junction point 292 and thus to the bases of transistor 272 and 274. Output conductor 372 is also connected through a conductor 382 and a resistor 384 to junction point 362. The purpose of the connection between output conductor 372 along conductor 382 and through resistor 384 is to provide a feed-back path for the comparator 342 to improve operation of the circuit for an unbalanced AC load as such a load might effect the magnetic flux of transformer 260 as will be explained hereinafter.

The negative input to comparator 342 on conductor 240 is connected through a resistor 390 and a capacitor 392 to a junction point 394. Junction point 338 is connected through a resistor 396 to junction point 394 which is also connected by a conductor 398 to junction point 326. Junction point 394 is also connected through a diode 400 to conductor 354 and thus to the output terminal 220. Diodes 334 and 400 are poled to conductor current in an upward direction in FIG. 2 and operate like the diodes 130 and 140 of FIG. 1. One purpose of resistor 390 and capacitor 392 is to reflect the change of voltage on conductor 398 to the negative input of comparator 342 on conductor 340 at the beginning of a half cycle to cause comparator 342 to change state if there was insufficient change in voltage on capacitor 330 during the previous half cycle to change its state. This could happen with a relatively high impedance AC load 216.

Another purpose of resistor 390 and capacitor 392 is to off set false signals which occur at point 324 when a resistance is in series with capacitor 330 (such resistances occur due to dissipation factor in typical electrolytic capacitors). During charge or discharge of capacitor 330, the voltage component of the series dissipation resistance makes the capacitor voltage change appear greater than it actually is. This would normally cause the comparator to switch earlier than it should. With resistor 390 and capacitor 392 providing a larger bias signal at the early part of each half cycle than near the end, a larger signal change is required at junction point 324 at the early part of each half cycle to switch the comparator at this time if such a capacitor charging signal occurs. This helps compensate for the case of high load currents causing larger false error signals across the series dissipation resistance of capacitor 330 occuring at junction point 324 early in each half cycle. The extra bias that must be overcome early in each half cycle delays switching of the capacitor for high load currents to allow the true capacitance charge voltage to reach a more accurate regulated value under this condition.

OPERATION OF FIG. 2

In consideration of the operation of FIG. 2 it will be convenient to first consider a balanced AC load with the four conditions used in connection with the operation of FIG. 1. With a balanced AC load conductor 382, resistors 384 and 360 and capacitor 364 are nor required. The first condition is where switches 244 and 245 are open as shown in FIG. 2 and the voltage supply from transformer 218 is in the positive half cycle where the voltage at terminal 212 is positive with respect to terminal 214. The second condition is where switches 244 and 245 are in the open condition and the voltage from transformer 218 is in the negative half cycle where to voltage at terminal 212 is negative with respect to terminal 214. The third condition is where switches 244 and 245 have been operated by the sensing and signal processing circuitry 226 to a closed condition and the voltage from transformer 218 is in the positive half cycle. The fourth condition is where switches 244 and 245 are closed and the voltage from the transformer 218 is in the negative half cycle.

In FIG. 2, there is no standby battery, so when power is intially applied through transformer 218, there is no voltage to either the comparator 342 or the sensing and signal processing circuit 226. With no output from comparator 342, neither of the transistors 272 or 274 are in an on condition. Thus, when the transformer 218 is in the positive half cycle, a path is provided to allow current flow from transformer 218 through junction point 212, conductors 250 and, assuming switches 244 and 245 are open, along conductor 318 to junction point 316, from junction point 316 down through diodes 302 and 304 to junction point 292 and from there along conductor 290 and through resistor 294, which has a high impedance, to junction point 266 through transformer winding 262 to junction point 257, through transformer winding 258, which has a small impedance, to terminal 214 and through load 216 back to transformer 218. Because the impedance of resistor 294 is high the amount of current in this circuit is negligible and insufficient to activate load 216. The impedance of resistor 294 is, however, low enough to provide the base current for transistor 272 and 274 with the result that transistor 274 is turned "on" while transistor 272 is turned "off". During the positive half cycle of the supply voltage, when transistor 274 becomes conducting, a current flow path exists from the upper terminal of the secondary of transformer 218 through terminal 212, conductor 250, junction point 284 down through resistor 283 to junction point 254, through transistor 274 and diode 282 to junction point 266 and from there through transformer winding 262 and transformer winding 258 to terminal 214 and through load 216 back to transformer 218. The impedance of winding 262 is large so that the current flow in this circuit is still insufficient to activate load 216 but is large enough to induce a current in transformer winding 264. The current from transformer winding 264 travels along conductor 320 to junction point 324 and down through capacitor 330 to conductor 332 upwards through diode 334 to junction point 326 and along conductor 322 back to transformer winding 264. Capacitor 330 then begins charging as was explained in connection with FIG. 1.

During the negative half cycle, a current path is provided from transformer 218 through load 216, terminal 214 and winding to junction point 257. Again with the switches 244 and 245 open, this current travels through winding 262, junction point 266, resistor 294, diodes 308 and 306, junction point 316, conductors 318 and 250 and terminal 212 back to transformer 218. Again because resistor 294 has high impedance, this current is negligible but sufficient to turn transistor 272 on. When this occurs, current may flow from transformer 218, through load 216, terminal 214, winding 258, junction point 257, winding 262, junction point 266, diode 280, transistor 272, junction point 254, resistor 283, junction point 248, conductor 250 and terminal 212 back to transformer 218. Again, since the impedance of winding 262 is large, this is insufficient to activate load 216 but does induce a current in winding 264 of transformer 260. The induced current travels along conductor 322 to junction point 326, along conductor 398 through diode 400 to output terminal 220, down through the capacitor 225 and zener diode 224 combination to output terminal 222, through capacitor 330 and junction point 324 back to winding 264 along conductor 320. As was the case in FIG. 1, the combination of zener diode and capacitor 225 receives a trickle charge with aid from capacitor 330, and starts to build up to operating potential. After a few cycles of operation, the voltage on capacitor 225 and zener diode 224 reacts a sufficient value that comparator 342 becomes operational and the system may proceed normally.

In the event that switches 244 and 245 were closed at the time of initial start up, then the current through winding 258 would induce a current in secondary 264 because without comparator 342 being operational, transistors 274 nd 272 could not be turned on enough to provide sufficient shorting action across winding 262 to prevent current transformation to winding 264. Thus capacitor 225 and zener diode 224 would charge up as described above until the circuit became operational after a few cycles.

Now, after the comparator becomes active and considering condition 1 where the switches 244 and 245 are open and the voltage supply from transformer 218 is in the positive half cycle, the normal output of comparator 342 on conductor 370 is positive and the inverted output on conductor 372 is negative. A current path exists from conductor 370 through resistor 344 to junction point 316, through diodes 302 and 304 to junction 310 and through conductor 266, junction point 292 and resistor 380 back to the inverted output on conductor 372. The voltage developed across diodes 302 and 304 provide a base drive to transistor 274 thereby turning it "on".

With transistor 274 on, a current path exists from terminal 212 to junction point 284 through resistor 283, junction point 254, transistor 274, diode 282, winding 262, winding 288 to terminal 214 and through load 216 to transformer 218. In the off state of switches 244 and 245 it has been found desirable to limit the peak current through load 216. This is accomplished by resistor 283 operating in combination with the voltage limiting drive to transistor 244 by diodes 302 and 304. As current increases through resistor 283, the emitter voltage at junction point 254 decreases with respect to the base voltage at junction point 292. This tends to turn transistor 274 off but as transistor 274 starts to turn off a balance is reached where just sufficient current is passed to transistor 274 to keep it on at a limited current level thus limiting the peak current through load 216.

The current from transistor 274 is sufficiently large to induce a current in secondary 264 thereby providing a current flow along conductor 320 through capacitor 330 through diode 334 and back to secondary 264 along conductor 322. As was the case in connection with FIG. 1 capacitor 330 begins charging when this current begins flowing and the voltage there across will be used in raising the voltage of the negative input terminal of comparator 342 to a point where it exceeds the voltage on the positive input terminal. This produces a change of state signal on the outputs of comparator 342 so that the signal on conductor 372 becomes positive to turn transistor 274 to an off condition and to attempt to turn transistor 272 to an "on" condition. Since transformer 218 is still producing a positive half cycle diode 280 prevents current flow through transistor 272 and accordingly there is no path for current flow through transformer winding 262, junction point 257, transformer winding 258 and load 216 during the remaining portion of the positive half cycle.

Now assuming the second condition where the negative half cycle starts, then a current will flow from the bottom portion of the secondary of transformer 218 through load 216, junction point 214 transformer winding 258, junction point 257, transformer winding 262, junction point 266, diode 280 and now through transistor 272, which is conducting since the current flow is in the opposite direction, junction point 254, resistor 283, junction point 284, conductors 285 and 250, terminal 212 and back to the upper portion of the secondary of transformer 218. Again this current flow through transistor 272 is very small because of the limiting action of resistor 283 in combination with diodes 306 and 208 in a manner similar to that explained above. The current is sufficient however to induce a current flow in the secondary 264 of transformer 260. This current flow passes through conductor 322, junction point 326, conductor 398, junction point 394 through diode 400 to conductor 354, output terminal 220 through the zener diode 224 and capacitor 225 combination, output terminal 222, along conductor 332 up through capacitor 330 to junction point 324 and back to the secondary winding 264 via conductor 320. As was the case in FIG. 1, in the above-described current path the capacitor 330 aids in the current flow through the zener diode 224 and capacitor 225 combination and the voltage at the negative input of comparator 342 is now greater than the supply voltage by the amount of voltage drop across diode 400. It therefore takes a small amount of time for the voltage on the negative input of comparator 342 to drop below the value of the voltage at the positive input of comparator 342 at which time the output on conductor 372 changes state which operates to turn transistor 272 off and attempt to turn transistor 274 on. Here again however, the diode 282 prevents current flow through transistor 274 and accordingly there is no current flow path through transformer winding 262, transformer winding 258 and load 216 during the remaining portion of the negative half cycle. Again, as with FIG. 1, a regulated current supply is produced by diode 400 due to the controlled voltage swing on capacitor 330.

Now assuming in condition 3 that switches 244 and 245 are closed and the output current from the transformer 218 is on the positive half cycle. Under these conditions there is a path for current flow from terminal 212 along conductor 250 to junction point 248, down through switch 245 and conductor 256 to junction point 257 through the small impedance winding 258 to terminal 214 and load 216. This is a high current path since the impedance of winding 258 is small turning load 216 on. A current is induced in the transformer winding 264 which travels along conductor 320 to junction point 324 through capacitor 330 to conductor 332 through diode 334 to junction point 326 and through conductor 322 back to transformer winding 264. A voltage is also mentioned in winding 262 which cannot travel through trnsistor 214 because diode 282 blocks current even though transistor 274 has base drive current for an "on" condition. The current from secondary 264 operates to charge capacitor 330 until the voltage at the negative terminal of comparator 342 exceeds that of positive terminal at which time the output on conductor 372 changes state turning transistor 272 to an "on" condition. The changed state of the output of comparator 242 now causes the transistor 272 to form an effective short circuit across the winding 262 by virtue of the path from terminal 266 through diode 280, transistor 272 to junction point 254 along conductor 253 and through switch 244 conductor 268 through switch 245 to conductor 256 and to the other side of transformer winding 260 to a junction point 257. This produces a reduced volts per turn in transistor 260 and, as was the case in connection with FIG. 1, no current flows through secondary 264 of transformer 260 for the remaining portion of the positive half. The switch 244 is used to provide a good short circuit path bypassing resistor 283.

Under the fourth condition when the current at transformer 218 changes to the negative half cycle with switches 244 and 245 closed, the current will flow through load 216, junction point 214 the winding 258 transformer 260 to junction point 257, along conductor 256 through switch 245 conductor 268 to junction point 248 and along conductor 250 to terminal 212 and the upper side of transformer 218. Again this is a high current path since the impedance of winding 258 is small and load 216 remains "on". With the reversal of polarity in transistor 260, transistor 272 although biased to be "on", does not conduct since no current can flow due to the blocking action of diode 280. A current is again induced in winding 264 which now travels along conductor 322, junction point 326 upward through junction point 394 and diode 400, conductor 354, to output terminal 220 down through zener diode 224 and capacitor 225 to output terminal 222 along conductor 332 upwards through capacitor 330 to junction point 324 and back to transformer winding 264 via conductor 320. As soon as the voltage at the negative input terminal of comparator 342 drops below the voltage at the positive input terminal, the output on conductor 372 again changes state, thereby turning transistor 274 "on". Again a short circuit path exists now through transistor 274 from the right side of transformer winding 262 through junction point 257, conductor 256, switch 245, conductor 268, switch 244, conductor 253, junction point 254, transistor 274, diode 282 and junction point 266 to the left hand side of transformer winding 262. This short circuit again reduces the volts per turn of transformer 260 and, as was the case in connection with FIG. 1, no current flows through transformer winding 262 for the remaining portion of the negative half cycle. Thus with a balanced load the circuit operates as in FIG. 1 to provide a regulated output supply in both the "on" and "off" states with minimal circuit dissipation;

i.e., low load current in the "off" state and low series voltage drop in the "on" state.

The above operation assumed a relatively balanced load condition. A problem may be encountered during an "on" condition of switches 244 and 245 when the load being operated has an unbalanced impedance between one polarity of the supply and the other. One effect of such a load is to produce a supply current which is unequal in magnitude for the positive and negative half cycles. For example some loads may produce an output current wave form which rises only a small amount in the positive direction, but a large amount in the negative direction. When this occurs with sufficient imbalance the comparator output may not switch at the proper time. In some cases, the Unbalance occurs in such a direction that it limits the effect of the charging capacitor 330 during the low current or positive half cycle of the load. Because of this the voltage from the capacitor 330 may be insufficient, when added to the signal from the transformer winding 264 at the beginning of the negative half cycle, to change the comparator state. The basic cause is that the magnetic flux of transformer 260 is driven so far from the zero position in one direction that the energy transfer between windings becomes ineffective.

Without a feed-back circuit, to be described, and with an unbalanced load and the current being, for example, greater during the negative half cycle than during the positive half cycle, there will be a smaller amount of current in winding 264 during the positive half cycle thereby taking a longer time for capacitor 330 to charge to a point where the voltage at the negative terminal of comparator 342 is above that of the positive terminal. The result of this is that the output state of comparator 342 will appear for longer periods during the positive half cylce before switching than during the negative half cycle. The state will change near the end of the positive half cycle and will change shortly after the beginning of the negative half cycle. This has the effect of shorting winding 262 for a shorter period of time during the positive half cycle than during the negative half cycle. Since the volts per turn are about equal in magnitude for both half cycles and since the flux in the transformer coil 260 is a function of the integral of the transformer's volts per turn with time, flux builds up more on the positive half cycle due to the longer time it is unshorted than on the negative half cycle and the system very rapidly reaches the point where the transformer magnetic flux becomes saturated. Thereafter capacitor 330 is incapable of reaching a value sufficient to cause comparator 342 to change state and a malfunction in operation of the circuit develops.

To overcome this problem the circuit of FIG. 2 employs a feed-back signal from the output of the comparator 342 to its input via conductor 382, resistor 384, junction point 362 and resistor 360, with junction point 362 connected to signal ground through capacitor 364. Basically, the feed-back signal responds to the unbalanced condition and operates to maintain suitable transformer flux balance.

More particularly, the feed-back circuit overcomes the problem by filtering the signal so that the average value of voltage at the plus terminal of comparator 342 is decreased with the described unbalanced condition. Capacitor 330 does not have to charge as high on the positive half cycle thereby reducing the volts per turn and the flux change during positive half cycle. Also during the negative half cycle the volts per turn is larger because there is less aid from capacitor 330. Therefore the integral of volts per turn with time is about equal for both half cycles and flux build up is eliminated while proper operation is provided. A similar operation would occur if the unbalance were in the opposite direction.

In an actual embodiment of the circuit of FIG. 2, the following compenents had the following values:
resistor 283—75 ohms
resistor 294—91,000 ohms
resistor 380—1,800 ohms
resistor 374—2,000 ohms
resistor 384—50,000 ohms
resistor 346—50,000 ohms
resistor 360—5,000 ohms
resistor 384—22,000 ohms
resistor 390—100,000 ohms
resistor 396—510,000 ohms
resistor 336—68,000 ohms
capacitor 364—10 μf
capacitor 330—100 μf
capacotpr 392—0.01 μf
capacitor 225—330 μf It is seen that I have provided a voltage supply circuit which will operate with both balanced and unbalanced loads in a two wire system and create a low voltage regulated output with a variety of input loads and currents. Many changes will occor to those skilled in the art and I do not intend to be limited by the specific disclosures used in connection with the description of the preferred embodiment. I intend only to be limited by the following claims.

The embodiments of the invention in which an exclusive property or right is claimed are defined as follows:

1. A circuit for use with a condition sensor having an input connected to a rechargeable direct current source and an output which changes from a first value to a second value when the condition reaches a predetermined value comprising:

first and second power input terminals for connection to an alternating current source and a load device to be activated by the condition sensor;

comparator means having first and second input terminals and output means, the comparator operable to produce a change of signal from a first value to a second value at the output means when the voltage at the first input terminal of the comparator exceeds the voltage at the second input terminal of the comparator;

means connecting the second input terminal of the comparator to a source of voltage of predetermined magnitude;

storage means connected to the first input terminal of the comparator and operable to supply a voltage to the first input terminal of the comparator of magnitude which is a function of the voltage of the storage means and which may vary above and below the predetermined voltage;

first switch means connected to the output means of the comparator, the first switch means having an "on" condition when the signal at the output means is of the first value and having an "off" condition when the signal at the output means is of the second value;

second switch means connected to the output means of the comparator, the second switch means having an "off" condition when the signal at the output means is of the first value and having an "on" condition when the signal at the output means is of the second value;

third switch means connected to receive the output of the condition sensor and having an "off" condition when the output is of the first value and having an "on" condition when the output is of the second value;

a transformer having a low impedance primary winding, a high impedance primary winding and a secondary winding;

means connecting the secondary winding to the storage means and to the rechargeable direct current source so as to increase the voltage at the storage means whenever current of a first sense is generated at the secondary winding and to charge the rechargeable direct current source whenever current of a second sense is generated at the secondary winding;

means connecting the first switch means when in an "on" condition in a first series circuit with the high impedance primary winding and the low impedance primary winding between the first and second power input terminals so that current of the first sense is generated at the secondary winding whenever the signal at the power input terminals is of a first polarity for a time sufficient to increase the voltage at the first input terminal of the comparator to a value above the predetermined voltage at the end of which time the output of the comparator changes from the first value to the second value and the first switch means changes to an "off" condition interrupting the first series circuit to stop the generation of the current of the first sense in the secondary winding;

means connecting the second switch means when in an "on" condition in a second series circuit with the high impedance primary winding and the low impedance primary winding between the first and second power input terminals so that current of the second sense is generated in the secondary winding whenever the signal at the power input terminals is of a second polarity for a time sufficient to decrease the voltage at the first input terminal of the comparator to a value below the predetermined value during which time the rechargeable direct current source is charged and at the end of which time the output of the comparator changes from the second value to the first value and the second switch means changes to an "off" condition interrupting the second series circuit to stop the generation of current of the second sense in the secondary winding; and means connecting the third switch means when in an "on" condition in a third series circuit with the low impedance primary between the power input terminals, connecting the third switch means when in an "on" condition in a fourth series circuit with the first switch means when in an "on" condition across the high impedance primary and connecting the third switch means when in an "on" condition in a fifth series circuit with the second switch means when in an "on" condition across the high impedance primary, the current in the low impedance primary generating a current of the first sense in the secondary when the signal at the power input terminals is of the first polarity until the signal at the output means of the comparator changes from the first value to the second value at which time the second switch means changes to an "on" condition and the fifth series circuit provides a shunt across the high impedance primary stopping the current of the first source in the secondary, the current in the low impedance primary generating current of the second sense in the secondary when the signal at the power input terminals is of the second polarity until the signal at the output means of the comparator changes from the second value to the first value at which time the first switch means changes to an "on" condition and the fourth series circuit produces a shunt across the high impedance primary stopping the current of the second sense in the secondary.

2. The circuit according to claim 1 wherein the first switch means comprises a solid state switch which is biased to an "on" condition by a signal of the first value from the comparator and an "off" condition by a signal of the second value and the second switch means comprises a solid state switch which is biased to an "off" condition by a signal of the first value and an "on" condition by a signal of the second value.

3. Apparatus according to claim 1 wherein the output means of the comparator comprises an inverted output connection and a non-inverted output connection.

4. Apparatus according to claim 3 wherein the first switch means comprises a PNP transistor with its base connected to the inverted output of the comparator and the second switch means comprises an NPN transistor with its base also connected to the inverted output of the comparator.

5. Apparatus according to claim 4 further including a pair of unidirectional current conductors connected in parallel but opposite current directions and the parallel combination connected between the inverted and the non-inverted output connections of the comparator.

6. Apparatus according to claim 5 wherein the collectors of the transistors are connected through oppositely directed unidirectional current conductors to one end of the high impedance winding of the transformer, the emitters of the transistors are connected through a resistor to the first power input terminal and the other end of the high impedance winding of the transformer is connected through the low impedance winding of the transformer to the second power input terminal.

7. Condition sensing apparatus comprising:
condition sensing means having an input and an output; the condition sensing means producing a signal at the output which changes from a first value to a second value when a predetermined condition is sensed;

rechargeable means connected to the input of the condition sensing means;

first and second power input terminals for connection to an alternating current source and a load to be controlled;

transformer means having a low impedance primary winding, a high impedance primary winding and a secondary winding;

first switch means having an "on" condition and an "off" condition;

first connection means connecting the first switch means to the output of the condition sensing means, the first switch means being in the "off" condition when the signal at the output of the condition sensing means is of the first value and being in the "on"

condition when the signal at the output of the condition sensing means is of the second value;

second connection means connecting the first switch means and the low impedance winding of the transformer means in series between the first and second power input terminals so as to provide a first current path between the first and second terminals when the switch means is in the "on" condition and to interrupt the first current path when the switch means is in the "off" condition;

comparator means having first and second inputs and output means, the comparator means producing a signal at the output means which changes from a first value to a second value when the voltage at the first input exceeds the voltage at the second input;

means connecting the rechargeable means to the second input of the comparator means to supply a voltage thereto;

voltage storing means connected to the secondary winding of the transformer means, the voltage storing means being alternately charged and discharged by alternate half cycles of a current induced in the secondary winding of the transformer means;

means connecting the voltage storing means to the first input of the comparator means to supply a voltage thereto which changes as a function of the voltage of the voltage storage means above and below the voltage at the second input of the comparator means;

means connecting the secondary winding of the transformer means to the rechargeable means to provide recharging current thereto during the half cycles that the voltage storing means is discharging;

second switch means connected to the output of the comparator means and controlled by the signal of the first value to provide a second current path, when the first switch means is in the "off" condition, between the first and second power input terminals through the high and low impedance primary winding of the transformer means to induce a current in the secondary winding thereof, and to interrupt the second current path when the signal at the output of the comparator means is of the second value, the second switch means also controlled by the signal of the second value to provide a third current path, when the first switch means is in the "on" condition, to shunt the high impedance primary winding of the transformer means and to interrupt the third current path when the signal at the output of the comparator means is of the first value.

8. Apparatus according to claim 7 wherein the secod switch means comprises a pair of solid state switches the first of which is biased "on" by a signal of the first value and biased "off" by a signal of the second value and the second of which is biased "off" by a signal of the first value and biased "on" by a signal of the second value.

9. Apparatus according to claim 7 further including means connecting the output means of the comparator means to the second input of the comparator means to provide feedback.

10. Apparatus according to claim 7 wherein the output means of the comparator comprises an inverted output connection and a non-inverted output connection.

11. Apparatus according to claim 10 wherein the second switch means comprises a PNP transistor and an NPN transistor with their bases connected to the inverted output connection of the comparator.

12. Apparatus according to claim 11 further including a pair of unidirectional current conductors connected in parallel but opposite current directions and the parallel combination connected between the inverted and the non-inverted output connections of the comparator.

13. Apparatus according to claim 12 wherein the collectors of the transistors are connected through oppositely directed unidirectional current devices to one end of the high impedance winding of the transformer means, the emitters of the transistors are connected through a resistor to the first power input terminal and the other end of the high impedance winding of the transformer means is connected through the low impedance winding of the transformer means to the second power input terminal.

* * * * *